E. H. KRIER & C. L. ERVIN.
Stencil-Plate.
No. 212,952. Patented Mar. 4, 1879.
Fig: 1.
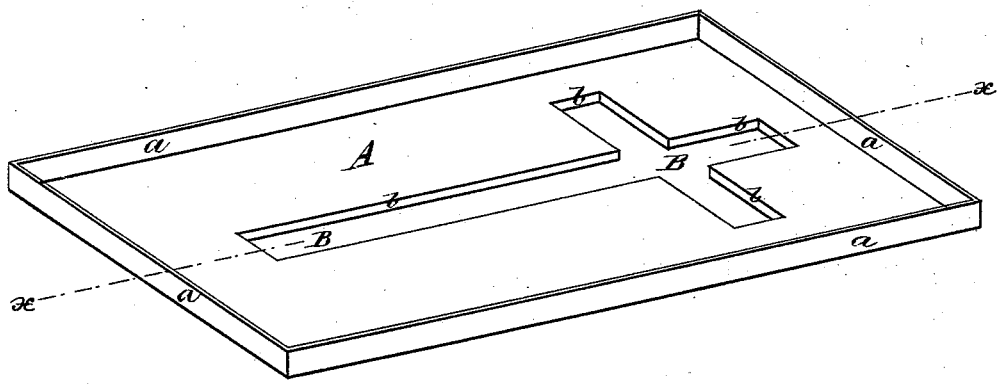
Fig: 2.
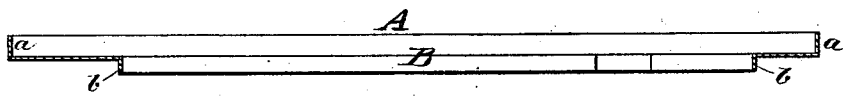
WITNESSES:
Achilles Schehl.
C. Sedgwick.
INVENTOR:
E. H. Krier
C. L. Ervin
BY Munn & Co
ATTORNEYS.

UNITED STATES PATENT OFFICE.

EDWARD H. KRIER AND CHARLES L. ERVIN, OF PLUM CREEK, NEBRASKA.

IMPROVEMENT IN STENCIL-PLATES.

Specification forming part of Letters Patent No. 212,952, dated March 4, 1879; application filed April 30, 1878.

*To all whom it may concern:*

Be it known that we, E. H. KRIER and C. L. ERVIN, of Plum Creek, Dawson county, Nebraska, have invented an Improvement in Cattle-Markers, of which the following is a specification:

The invention will first be described in connection with the drawings, and then pointed out in the claim.

Figure of drawings is a perspective view; Fig. 2, a longitudinal section.

A represents a plate having an excision in the form of the owner's initial, or any desired mark, and preferably an upper flange, $a$, to confine the acid to and strengthen the plate. On the lower side of the plate is arranged a downwardly-projecting flange, $b$, that is pressed into close contact with the hide of the animal, to prevent the spread of the sulphuric or other corrosive acid beyond the limit of the opening B.

After the lapse of about ten days from the application of the acid, the hair falls out and leaves a distinctly visible mark of the desired shape.

Having thus described all that is necessary to a full understanding of our invention, what we claim as new is—

The marker-plate A having an excision, B, of any desired form, and the downward projection $b$, arranged below and around said excision or opening, as and for the purpose specified.

EDWARD HARRIS KRIER.
CHARLES LEMON ERVIN.

Witnesses:
H. O. SMITH,
E. McGUFFIN.